MULTI-APERTURED MAGNETIC MEMORY SYSTEM AND DEVICE

Filed Oct. 15, 1962 3 Sheets-Sheet 1

INVENTORS
JOSEPH W. CROWNOVER
BEVITT J. NORRIS
BY C. A. Weigel, Jr.
ATTORNEY

MULTI-APERTURED MAGNETIC MEMORY SYSTEM AND DEVICE

Filed Oct. 15, 1962 3 Sheets-Sheet 2

INVENTORS
JOSEPH W. CROWNOVER
BEVITT J. NORRIS
BY C. A. Weigel, Jr.
ATTORNEY

MULTI-APERTURED MAGNETIC MEMORY SYSTEM AND DEVICE

Filed Oct. 15, 1962

INVENTORS
JOSEPH W. CROWNOVER
BEVITT J. NORRIS
BY C. A. Weigel, Jr.
ATTORNEY 3,268,876
Patented August 23, 1966

3,268,876

MULTI-APERTURED MAGNETIC MEMORY SYSTEM AND DEVICE

Bevitt J. Norris and Joseph W. Crownover, La Jolla, Calif., assignors, by mesne assignments, to Control Data Corporation, Minneapolis, Minn., a corporation of Minnesota Filed Oct. 15, 1962, Ser. No. 230,606
19 Claims. (Cl. 340—174)

This invention relates to magnetic memory systems and, more particularly, to an improved, multi-apertured ferrite plate that finds use in such memory systems.

Magnetic memory systems are well known in the data processing and computer arts and in the past have taken the general form of an array of discrete magnetic elements, or cores. The magnetic material used for the cores is selected to have a rectangular hysteresis magnetization characteristic such that the cores have two well-defined extremes or states of remanent magnetization. The two states "0" and "1" of a binary information signal may be respectively represented by the positive (P) and negative (N) states of remanent magnetization of the core material. Typical of these present day magnetic memory systems are those described in U.S. Patent No. 2,784,391 issued March 5, 1957, to Rajchman and Endres and U.S. Patent No. 2,889,540 issued June 2, 1959, to Bauer and Haynes. The Bauer et al. patent describes a coincident-current type memory wherein a desired core in a two dimensional array of discrete cores is selected by means of two "half-excitation" select currents. These two select currents are applied through row and column windings which thread the discrete cores. A separate inhibit winding is often used in coincident-current type memories to provide advantages in using a common address for a plurality of stacked arrays.

An additional sense winding linking each of the plurality of discrete cores of an array is employed to read out the stored information by sensing a magnetic flux change in the selected core. In order to sense, or interrogate, a particular core, its remanent state of magnetization is tested by driving the particular core to a predetermined state of magnetic saturation. If the core is already in this predetermined state, a relatively small voltage signal is induced in the sense winding. On the other hand, if the core is not in the predetermined state of remanent magnetization, but is in the opposite state, a relatively large voltage signal is derived. Such readout is said to be destructive in that it destroys the magnetic representation of the stored information. Additional memory time is required to restore the interrogated core to its original state of remanent magnetization. Aside from the disadvantage of requiring additional time due to their destructive read-out characteristics, many conventional magnetic core memories are relatively difficult to wire, occupy a relatively large amount of space, and due to loose cores, are somewhat limited in the amount of shock and vibration they can withstand.

Some of these disadvantages have been obviated by memory systems using multi-apertured ferrite plates. One memory system of this type is described in U.S. Patent No. 2,942,240 issued June 21, 1960, to Rajchman and Lo. Unfortunately, the Rajchman et al. plates still are not capable of efficient non-destructive read-out in that they require the use of two or more apertures for each stored bit of information. This is not the most efficient usage of the magnetic material and tends to increase the physical space requirements of the memory.

It is therefore an object of this invention to obviate many of the disadvantages of the prior art memory systems.

Another object of this invention is to facilitate the storage of information using a multi-apertured magnetic plate in which the magnetic material surrounding each and every aperture is capable of being selectively magnetized to either of two different senses of remanent magnetization to represent digital information.

Still another object of this invention is to non-destructively read out information represented by the remanent magnetic state of the magnetic material surrounding each of the apertures of a multi-apertured magnetic plate.

Still another object of this invention is to provide a novel multi-apertured magnetic plate memory of the coincident-current type, characterized by the non-destructive read-out of the stored information.

In accordance with a preferred embodiment of this invention, a multi-apertured magnetic structure is provided in which the magnetic material surrounding each aperture is capable of being selectively magnetized in either of two different senses of remanent magnetization to represent digital information. The multi-apertured structure typically is formed from a slab of magnetic material which has a substantially constant thickness, exhibits a substantially rectangular magnetic hysteresis characteristic, and has substantially parallel first and second planar surfaces defining the thickness dimension. The slab is formed to have (1) a first set of substantially parallel grooves lying in a first direction and alternately disposed in the first and second surfaces and (2) a second set of substantially parallel grooves lying in a second direction substantially perpendicular to the first direction and alternately disposed in the first and second surfaces. Each of the several grooves has a depth that is substantially equal to or greater than half the thickness of the slab such that the intersections of the sets of grooves form apertures in the slab. Additionally, each of the grooves is formed to have a width that is substanially equal to or greater than the spacing between successive grooves of a given set.

Thus formed there are established first and second sets of effective tunnels in the interior portion of the slab substantially parallel to each of the surfaces. These tunnels provide a means of access by which the magnetic material surrounding the several apertures may be linked magnetically such as by threading separate energizing means through selected ones of the tunnels. By appropriately selecting the tunnels that are threaded, a coincident-current type memory may be formed wherein the magnetic material surrounding each aperture constitutes a storage element.

Each aperture in the plate may be threaded by an appropriate energizing means, such as a wire, through any one of five different paths. One wiring path is through the aperture in a direction perpendicular to the plane of the plate. The remaining four paths lie entirely within the internal tunnel plane. In the tunnel plane, two parallel entrances to each aperture exists in orthogonal directions, for a total of four. In accordance with one embodiment of the invention, only these tunnels are utilized to form a two dimensional random-access memory having row and column drive windings as well as sense and inhibit windings.

This multi-apertured plate has a distinct advantage over many prior configurations of its type in that each storage element is substantially magnetically isolated from every other storage element. This permits more efficient utilization of the magnetic material and a closer packing density of the several storage elements.

The novel geometric configuration of the apertures permits the magnetic material forming each aperture (storage element) to be interrogated non-destructively by the use of a total select current of insufficient amplitude to change its remanent state of magnetization. If the magnetic material forming a given storage element is excited by a "half-excitation" select current, for example, a unique output signal is induced in the sense winding linking that storage element. The output signal has an amplitude that is a function of the remanent state of magnetization of the magnetic material forming the storage element, i.e., whether it is storing a "0" or a "1."

Further advantages and features of this invention will become apparent upon consideration of the following description read in conjunction with the drawings wherein.

Figures 1, 2:
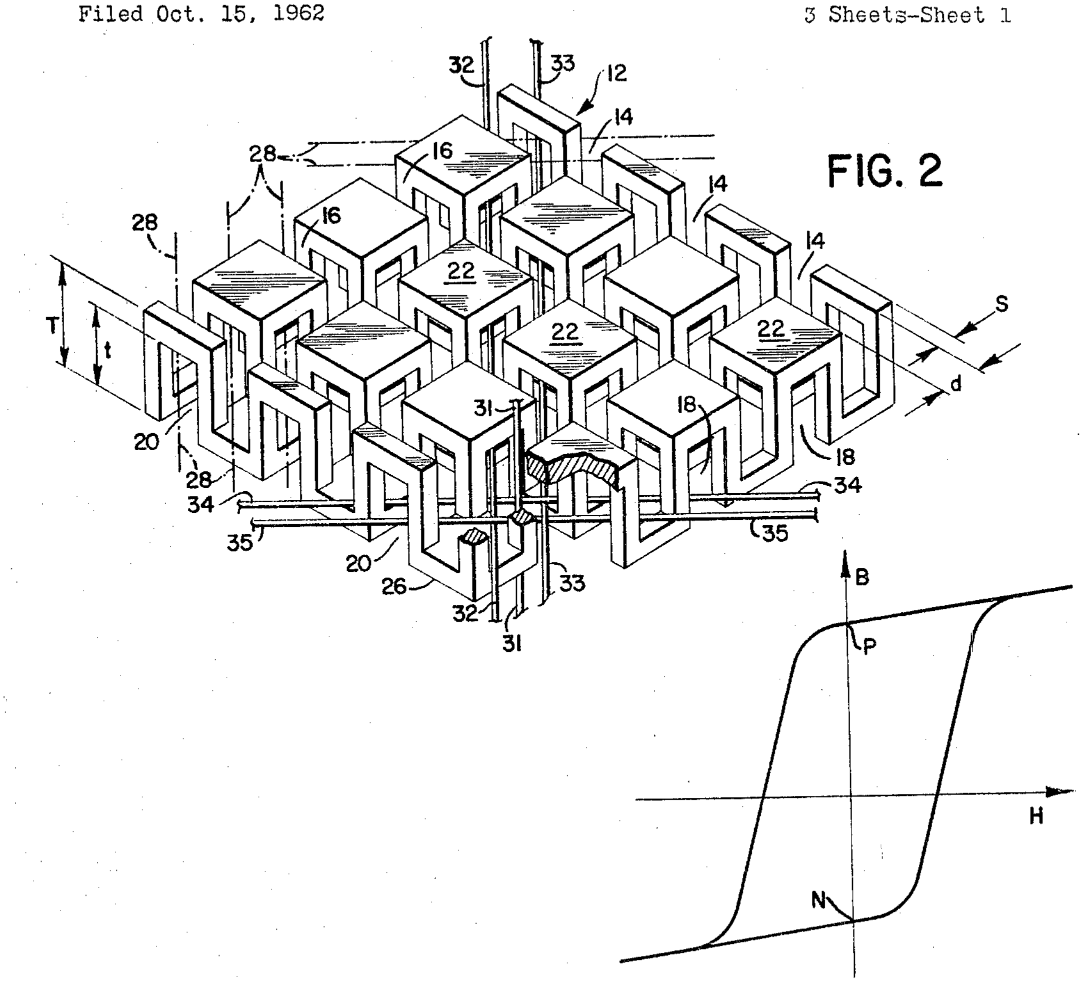
FIGURE 1 is a graphic plot of magnetizing force (H) vs. magnetic flux (B) showing the typical hysteresis loop exhibited by the ferrite material used to form the apertured plate illustrated in FIG. 2.
FIG. 2 is a pictorial view, considerably enlarged and partly cut away, of the multi-apertured ferrite plate of this invention illustrating the several wiring paths available to a given aperture.

The magnetic material employed in the present invention is characterized by a substantially rectangular magnetic hysteresis loop of a well known type illustrated in FIG. 1. The term rectangular hysteresis loop is descriptive of the shape of the curve that is derived from the plot in FIG. 1 of the magnetizing force H along a horizontal axis (abscissa) versus the resulting magenetic flux B along a vertical axis (ordinant) for a given sample of magnetic material. Magnetic material exhibiting a substantially rectangular hysteresis loop has the characteristic of being substantially magnetically saturated at remanence. In the absence of magnetizing force, this remanent magnetic saturation may be in a first sense or a second sense opposite to the first sense. These two senses of saturation at remanence are referred to as remanent states. Thus the intersection P of the upper portion of the hysteresis loop of FIG. 1 with the vertical magnetic flux axis (the point of zero magnetizing force) may be taken to represent one remanent state (P) and the intersection N of the lower portion of the hysteresis loop with the magnetic flux axis may be taken to represent the opposite remanent state (N). A suitable magnetic material for use in this invention may be a ceramic-like ferromagnetic material such as manganese-magnesium ferrite.

By way of further definition of terms, there are two senses of flux flow around a closed flux path. A positive current flowing into a surface bounded by the magnetic flux path produces a clockwise flux flow. One remanent state (N), with reference to a closed flux path, is that in which the saturating flux is directed in a clockwise sense (as viewed from one side of the surface) around the closed path, and the other remanent state (P) is that in which the saturating flux is directed in the counterclockwise sense (as viewed from the same side of the surface) around the closed path.

Figure 3:
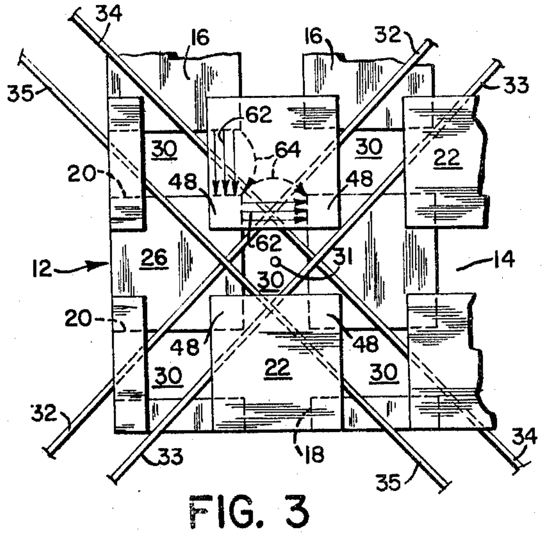
FIG. 3 is a plan view, considerably enlarged, of a portion of the ferrite plate illustrated in FIG. 2.

In accordance with a preferred embodiment of this invention illustrated in FIGS. 2 and 3, a thin multi-apertured plate 12 is formed having substantially parallel upper and lower planar surfaces 22 and 26, respectively, such as to have a substantially constant thickness T (defined by such surfaces 22 and 26).

Two sets of parallel grooves 14, 20 and 16, 18, respectively, are formed in the plate 12. The first set of parallel grooves 14, 20 lie in a first direction with successive ones of the grooves 14 and 20 being alternately disposed in the upper and lower surfaces 22 and 26, respectively. The second set of grooves 16, 18 each lie in a second direction substantially perpendicular to the first direction with successive ones of the grooves 16 and 18 being alternately disposed in the upper and lower surfaces 22 and 26, respectively.

In a preferred embodiment of the invention, each of the grooves 14, 16, 18, and 20 have a rectangular cross section and a width "*d*." The parallel grooves 14, 20 and 16, 18 of each set are equispaced by the distance "*s*" where the width "*d*" is substantially equal to or greater than the spacing "*s*" between successive grooves of a given set. Each of the grooves 14, 16, 18, and 20 has a depth "*t*" that is substantially equal to or greater than half of the thickness "T" of the plate 12. With these dimensions, intersections of each of the grooves 14 and 16 in the upper surface 22 with the grooves 16 and 18 in the lower surface 26 form apertures 30 (FIG. 3) in the plate 12.

The apertured plate described may be constructed in accordance with the novel cutting method described in an application Serial No. 164,525, filed January 5, 1962, entitled, "Memory Systems and Devices," by J. W. Crownover and assigned to Daystrom, Incorporated. As described therein, the several grooves 14, 16, 18 and 20 are formed in the plates 12 as by cutting with a diamond saw, by ultrasonic abrading, or by an electron beam. Alternatively, the plates may be formed by molding the ferrite material in its "green" state prior to vitrification.

By so forming the plate 12 to have grooves greater in depth "*t*" than half of the thickness "T" of the plate, additional sets of effective holes, or tunnels, denoted by the lines 28 (FIG. 2) are formed. In the described preferred embodiment, the several tunnels 28 each lie at an angle of substantially 45° with respect to the orthogonally disposed grooves 14, 16, 18 and 20. This angle will vary if the respective sets of grooves 14, 20 and 16, 18 have (1) different widths "*d*" or (2) lie at angles other than 90° with respect to each other. In any event, with equi-spaced grooves, the several tunnels 28 bisect the angles between the respective ones of the sets of grooves 14, 20 and 16, 18, respectively. The several tunnels 28 form an effective lateral plane of tunnels which will be referred to hereinafter as a "tunnel plane." This additional set of holes, or tunnels, 28 is clearly visible to the observer if the plate 12 is viewed edgewise from a point at a 45° angle to any of the grooves 14, 16, 18 or 20.

If the grooves 14, 16, 18 and 20 are formed to a depth "*t*" that exceeds one half the thickness "T" of the apertured plate 12 by the amount "R," wires having a diameter 2R may be threaded through the tunnels formed by this construction. The depths "*t*" of the several grooves 14, 16, 18 and 20 may vary to accommodate different needs over a considerable range as long as the sum of the depths "*t*" of the grooves 14 and 16 in the upper surface 22 and the depths "*t*" of the grooves 18 and 20 in the lower surface 26 is substantially equal to or greater than the thickness "T" of the plate 12. Obviously, the depths "*t*" of any groove may not equal or exceed the thickness "T" of the plate 12, else the plate will be cut in two.

The geometry of the several sets of grooves 14, 16, 18 and 20, respectively, and the resultant tunnels 28 which form the tunnel plane make it quite easy to thread or magnetically link the magnetic material forming each of the several apertures 30. The apertures 30 of the multi-apertured plate 12 may be easily wired to form a coincident-current type memory by threading wires in different directions through the several tunnels 28 or through the apertures 30 in a direction perpendicular to the apertured plate 12.

A detailed inspection of the multi-apertured plate 12 reveals that there exist as many as five distinct paths through which the wires may thread each aperture 30. The most obvious direction, as illustrated by the wire 31, is directly through the apertured plate 12 in a direction perpendicular to the upper and lower surfaces 22 and 26, respectfully. The remaining four wiring directions lie entirely within the tunnel plane. Thus the front inside aperture 30 (partly cut away in FIG. 2 of the drawing) may be threaded by either of the two parallel wires 32 or 33 which lie in the tunnel plane at an angle of 45° with respect to the grooves 14, 16, 18 and 20. This same front aperture 30 also may be threaded by two parallel wires 34 and 35 which also lie in the tunnel plane, but are at an angle of 45° with respect to the several grooves 14, 16, 18 and 20 and are at an angle of 90° with respect to the first two wires 32 and 33.

The magnetic material surrounding each aperture 30 may be considered to constitute a separate storage element and may be said to have two parallel entrances in the tunnel plane in two orthogonal directions. The two entrances in each orthogonal direction have an advantage in that the same direction of current flow, depending upon the entrance employed, may drive the magnetic material surrounding the aperture to either the "P" or "N" states of remanent magnetization. This advantage is more easily understood by reference to FIG. 4 in which the magnetic material forming a single aperture 30 is illustrated. The magnetic material forming each of the apertures 30 (FIGS. 2 and 3) of the apertures plate 12 forms a closed magnetic flux path, illustrated in FIG. 4 which may be magnetized to represent digital information. Hence each of the apertures 30 (FIGS. 2 and 3) will hereinafter be referred to as a storage element.

Figure 4:
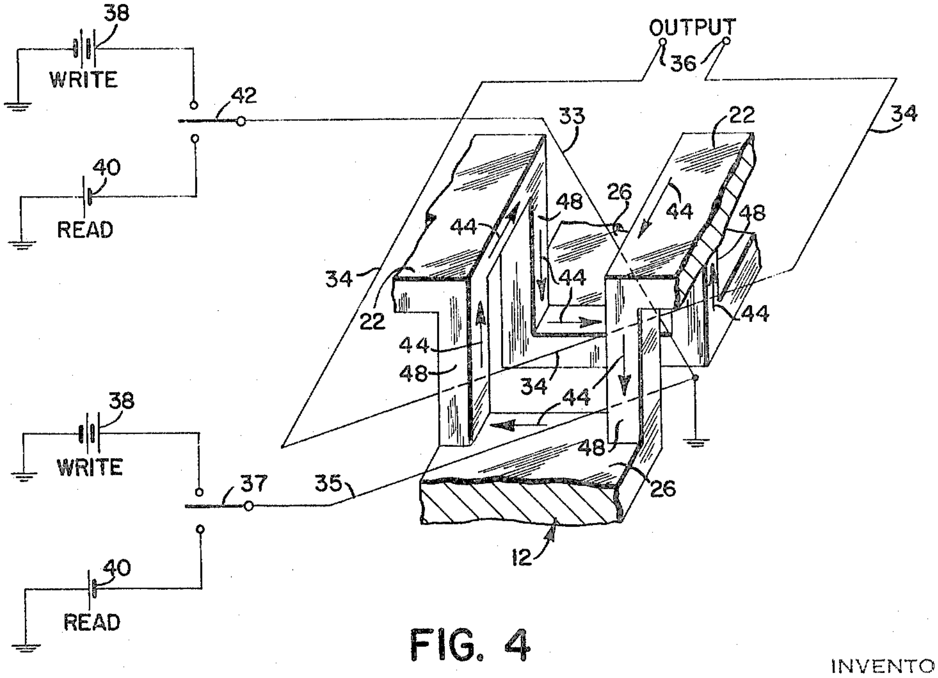
FIG. 4 is a pictorial view, considerably enlarged, of a single aperture in the plate illustrated in FIGS. 2 and 3, showing one manner of threading wires through a single aperture.

In FIG. 4 the single storage element is threaded by three wires 33, 34, and 35 respectively, corresponding to the like numbered wires illustrated in FIGS. 2 and 3. Two of the wires 35 and 33 may be considered as row and column drive windings, respectively, whereas the third wire 34 may be considered as a sense winding having an output available at terminals 36.

The row drive winding 35 has one end grounded and the other end connected through a double pole-single throw switch 37 to either the positive terminal of a write current source, illustrated as a battery 38, or the negative terminal of a read current source, illustrated as a battery 40. The remaining terminals of each of the batteries 38 and 40 are connected to ground to complete the circuit. The write current source 38 is capable of providing twice the current flow of the read current source 40 so as to permit the non-destructive read-out of the storage element as will be described hereinafter. In like manner, one end of the column drive winding 33 is connected through a double pole-single throw switch 42 to write and read current sources illustrated by the batteries 38 and 40, respectively. The current available from each of the write current sources 38 is equivalent to or is equal to a half-excitation select current which, using conventional memory techniques, is half of that current required to fully magnetically saturate the magnetic material excited by the select current.

If, by the way of example, the row switch 37 is connected to the write current source 38, current passes through the winding 35 and establishes a flux in the storage element of FIG. 4 in a clockwise direction as illustrated by the arrows 44. In like manner, if the column switch 42 is connected to the write current source 38, the current through the column drive winding 33 establishes a flux about the storage element, also in a clockwise direction as illustrated by the arrows 44. If the two half-excitation select currents are simultaneously passed through the row and column drive windings 35 and 33, respectively, the storage element is driven to the N state of magnetic saturation.

The storage element of FIG. 4 may be destructively sensed using conventional memory techniques by the simultaneous application of two half-excitation read currents through the row and column drive windings 35 and 33. These read currents (being of opposite polarity to the write currents) drive the storage element to the "P" state of magnetic saturation. The resulting change of flux in the storage element induces a voltage signal in the sense winding 34. This prior art technique, by its very nature destroys the information formerly represented by the remanent magnetic state of the storage element.

The storage element of FIG. 4 may be non-destructively sensed by momentarily connecting the switches 37 and 42 to the read current sources 40. Each of the read current sources 40 pass a quarter-excitation select current through the respective row and column drive windings 35 and 33. Assume, for example, that the storage element is in the N remanant magnetic state. These excitations are of insufficient amplitude to vary the remanent state of the storage element. Since the read current from the sources 40 is of opposite polarity to the write current, it produces a counter-clockwise flux in the storage element. This flux change generates a relatively large output voltage in the sense winding 34 which is available at the output terminals 36.

If on the other hand, the storage element were in the P remanent state of magnetization, with the flux in a counter-clockwise direction (opposite that illustrated by the arrows 44), a total read current of "half-excitation" amplitude produces relatively little flux change and a correspondingly small induced voltage in the sense winding 34. This non-destructive read-out property of each of the storage elements 30 of the apertured plate 20 (FIGS. 2 and 3), as typified by the discrete storage element of FIG. 4, is believed to be the result of their unique geometric configuration. As may be observed in FIG. 4 the flux 44 traversing the storage element exists in at least two different directions which are at an angle other than 0° with respect to each other. In the illustration of FIG. 4, for example, it may be seen that magnetic flux exists in at least two different orthogonal planes, i.e., those formed by the major axes of each of the pairs of the vertical legs 48, and those formed by the major axes of each of the remaining legs. These planes are substantially perpendicular to each other, i.e., the angle between the planes is 90°.

A particular advantage of the unique geometric configuration of the multi-apertured plate of FIGS. 2 and 3 is that the magnetic flux in each storage element is substantially isolated from the magnetic flux in every other storage element. While each of the diagonally disposed apertures 30 have a common vertical leg 48 through which their common flux passes, this does not and cannot appreciably affect the remanent magnetic state of the magnetic material forming each storage element 30. The reason for this is that the four legs having a major axis lying in the plane of the plate 12 are substantially magnetically isolated from the legs of every other storage element 30. Hence they afford relatively little magnetic flux linkage between adjacent apertures 30. In FIG. 3, for example, the main magnetic flux established by a current flowing downwardly through wire 31 is illustrated by the arrows 60. A similar magnetic flux in the upper left (in the drawing) aperture 30 is denoted by the arrows 62. While there may be some fringe magnetic flux interference denoted by the dotted arrows 64, the fringe magnetic flux is negligible compared to the primary magnetic flux 60, 62 and the several storage elements are seen to be substantially magnetically isolated.

Figure 5:
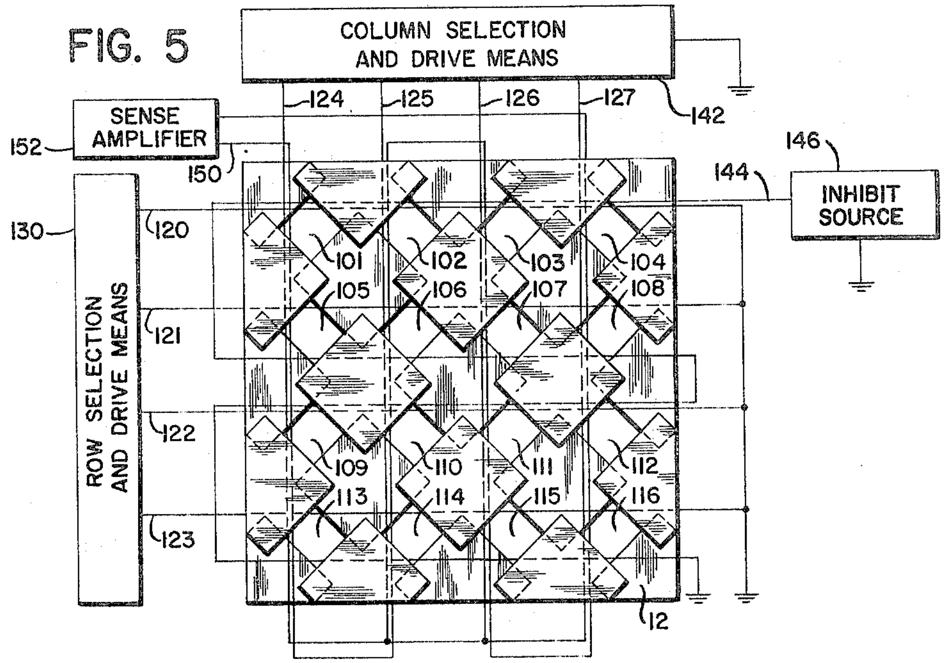
FIG. 5 is a plan view of one form of a two dimensional coincident-current type memory that can be constructed using a multi-apertured plate of the general type illustrated in FIGS. 2 and 3.

The novel multi-apertured plate illustrated in FIGS. 2 and 3 may be wired in many ways to provide for the storage of information. The wiring may utilize any of the five different wiring directions that exist for each storage element. One suitable wiring technique utilizing only the internal tunnel plane to provide a two dimensional sixteen bit apertured plate memory is illustrated in FIG. 5. The memory of FIG. 5 is formed by trimming the outside edges of the apertured plate 12 (FIG. 2) along lines substantially parallel to the orthogonal sets of tunnels 28 within the plate rather than parallel to the grooves 14, 16, 18 or 20. This permits the apertured plate 12 (FIG. 2) to be wired easily using the tunnels 28 to form a 4 x 4 coincident-current type memory.

The apertured plate 12 of FIG. 5 has sixteen storage elements 101 to 116 inclusive. Individual row drive windings 120 to 123, inclusive, are each threaded through a different tunnel 28 (FIG. 2) to link magnetically the four storage elements of each row. The storage elements 101 to 116 of each row are linked alternately positively and negatively by using those tunnels used by the wire 34 (FIG. 2). A storage element is said to be negatively linked if it is threaded by a wire which enters each element by passing over one leg and leaves such element by passing under a leg. Conversely, a storage element is said to be positively linked if it is threaded by a wire which enters each element by passing under one leg and leaves such element by passing over a leg. With such wiring a positive current to ground drives each negatively linked storage element 101, 103, 106, 108, 109, 111, 114, and 116 toward the N state of magnetization and each positively linked storage element 102, 104, 105, 107, 110, 112, 113, and 115 toward the P state of magnetization.

A negatively linked storage element is said to store a binary "1" when it is in its N remanent magnetic state. Conversely, a positively linked storage element is said to store a binary "1" when it is in P remanent magnetic state. These conventions are used since a positive current to ground through a common linking wire drives the positively linked storage element toward the P state of saturation, but drives the negatively linked storage element toward the N state of saturation. Alternatively, of course, the memory drive circuitry can be programmed to invert the polarity of the read and write current pulses when a positively linked storage element is addressed.

Individual column drive windings 124 through 127, inclusive, are threaded through the appropriate tunnels to link each different column of storage elements 101–116, inclusive, in the same sense as the row drive windings 120–123. The several row drive windings 120–123 are connected to be individually driven by a row selection and drive means 130. The several column drive windings 124–127 are connected to be individually driven by a column selection and drive means 142.

A separate inhibit winding 144 threads each of the storage elements 101–116, inclusive, through tunnels in a direction generally parallelling that of the row drive windings 120–123. The difference is that the inhibit winding 144 is threaded through the tunnels of the apertured plate 12 to link each of the storage elements 101–116 oppositely to the manner in which they are linked by the respective row drive windings 120–123. Thus the inhibit winding 144 progresses from an inhibit drive source 146 to the left (in the drawing) through the right hand entrance of each of the storage elements 104, 103, 102 and 101. Next the inhibit winding 144 progresses to the right (in the drawing) through the right hand entrance to each of the second row of memory elements 105, 106, 107 and 108. Continuing, the inhibit winding 144 then parallels the third row drive winding 122, by progressing to the left (in the drawing) to thread each of the storage elements 112, 111, 110, and 109. Finally, the inhibit winding 144 passes to the right (in the drawing) through the right hand entrance of each of the fourth row of storage elements 113, 114, 115 and 116 to ground to complete the circuit from the inhibit source 146.

By observation of the fourth storage element 104, it may be seen that if a positive current to ground is flowing through each of the fourth column drive winding 127 and the inhibit winding 144, mutually opposing flux tends to be established by each of these windings. Hence the inhibit function is achieved.

Lastly a sense winding 150, connected to a conventional sense amplifier 152, is threaded through the tunnels in the apertured plate 12 in an otherwise conventional linking manner to provide noise cancellation. In the drawing of FIG. 5, the sense winding 150 is illustrated as linking one half of the storage elements 101–116, inclusive, in a positive sense and the remaining half in a negative sense. This sense winding arrangement is merely one of several known noise cancellation techniques that can be used. Some noise cancellation scheme is necessary, as in a magnetic core arrays, because practical magnetic materials do not exhibit perfectly rectangular hysteresis loops. This results in the half-selected storage elements, i.e., those linked by the selected row and column windings, inducing a noise voltage in the common sense winding 150. Without noise cancellation, the cumulative effect of these noise voltages may tend to mask the desired output signal.

The row and column selection means 130 and 142, respectively, the inhibit source 146, and the sense amplifier 152 are all well known units in the art. The row and column selection and drive means 130 and 142 each operate in a conventional way to apply coincident pulses to a selected one of the row drive windings 120 through 123 and a selected one of the column drive windings 124 through 127. That storage element lying at the intersection of the selected row and column drive winding is the selected element.

During the write cycle of the memory operation, half amplitude select currents are applied to the selected one of the row and column drive windings such that the selected element lying at their intersection receives a full amplitude excitation current. Such current drives the selected storage element to the N state (or the P state depending on the linkage sense) of magnetic saturation which then returns to a corresponding remanent magnetic state. To select the first element 101, for example, the first row and column drive windings 120 and 124 respectively, are energized. In this instance those storage elements 102, 103, 104, 105, 109 and 113 lying along the selected row and column drive windings are only partially driven to magnetic saturation and conventionally are referred to as the half-selected elements.

Next during the read cycle of the memory, the first storage element 101 may be sensed destructively by applying half-excitation select currents to the first row and column drive windings 120 and 124, respectively. The read currents, of course, are of opposite polarity to the write currents and test the selected first storage element 101 by driving it to the P state of magnetic saturation since it is negatively linked by the drive windings. Conversely, if the selected storage element is positively linked by the drive windings, the read currents drive that element to the N state of magnetic saturation. The net output signal is of a relatively large amplitude, of either polarity, when the selected first storage element 101 is in the N state of magnetic saturation at remanence of the relatively small amplitude when the selected first element 101 is already in the P remanent state. The converse is true for each of the storage elements that are positively linked by the drive windings. The different amplitudes result from the selected first element 101 producing a much larger signal in changing from the N remanent state to the P remanent state, as when storing a binary "1" than when the selected first element is already in the P remanent state, as when storing a binary "0."

Nondestructive readout of the storage elements 101–116 is achieved by reducing the amplitude of the read pulses (as described in conjunction with FIG. 4) such that the total excitation of any storage element is less than that required to switch the magnetic material of the element from one sense of magnetic polarization to the other. To interrogate non-destructively the first element 101, for example, quarter-amplitude select currents are applied to the first row and column drive windings 120 and 124, respectively. The selected first element 101, which lies at their intersection, receives a total excitation that is half of that required to switch the storage element. Using the novel apertured plate 12 of this invention, such excitation is sufficient to induce an output voltage in the sense winding 150 having an amplitude indicative of the existing state of remanent magnetic saturation of the selected element, i.e., a relatively large amplitude output signal is produced when the interrogated element is storing a binary "1."

The inhibit source 146 functions in a conventional manner during the write cycle of the memory to effectively cancel the effect of one of the coincident write pulses, namely the row write pulse. The remaining column write pulse alone cannot reverse the existing state or magnetization of the storage element. Hence, the writing operation is effectively inhibited. Any suitable means such as logic control unit of a digital computer, may be used to generate and apply the various signals used in operating the apertured plate memory of FIG. 5.

Although the non-destructive read-out feature of this invention was typically described as using quarter-amplitude select currents, other current amplitudes may be used. The particular amplitudes selected will depend upon (1) the characteristics of the magnetic material, (2) the size of the grooves employed, (3) the thickness of the plate 12, and (4) the spacing between the grooves. The limit upon the amplitude of the select currents employed is determined by the point in the magnetization characteristic of FIG. 1 at which the magnetic material switches from one sense of magnetization to the other. The cumulative effect of the two currents in practical cases should be less than the excitation required for the magnetic state of the material to traverse its magnetization characteristic beyond the "knee" of the curve. A plurality of the apertured plates 12 may be stacked together in a manner similar to the stacking of present magnetic core arrays to form a three-dimensional memory.

The advantages afforded by the subject invention are (1) a closer packing density of storage elements, (2) better ability to withstand shock and vibration, (3) non-destructive read-out of the stored information, and (4) better magnetic isolation between the several storage elements.

The thickness T of the plates 12 used with this invention should be maintained to a relatively close tolerance to maintain the magnetic characteristics of each of the storage elements 101–116 substantially the same. The same comment is applicable to the groove widths and the spacing between grooves. It also should be pointed out that because the hysteresis loop of the magnetic material forming each of the storage elements is not perfectly rectangular, some noise will be generated, as in conventional core memories. Also, some flux tends to flow around a longer path which may include several apertures. However, the amplitude of the excitation current may easily be limited to that which permits magnetic saturation of a given storage element 101–116, but minimizes the flux flow around any longer path than the magnetic material of a given aperture 30. Due to the unique structure of the apertured plate 12, any interference between adjacent storage elements 101–116 (FIG. 5), due to leakage flux flow around a longer path than that around a given excited storage element, is relatively small.

Figure 7:
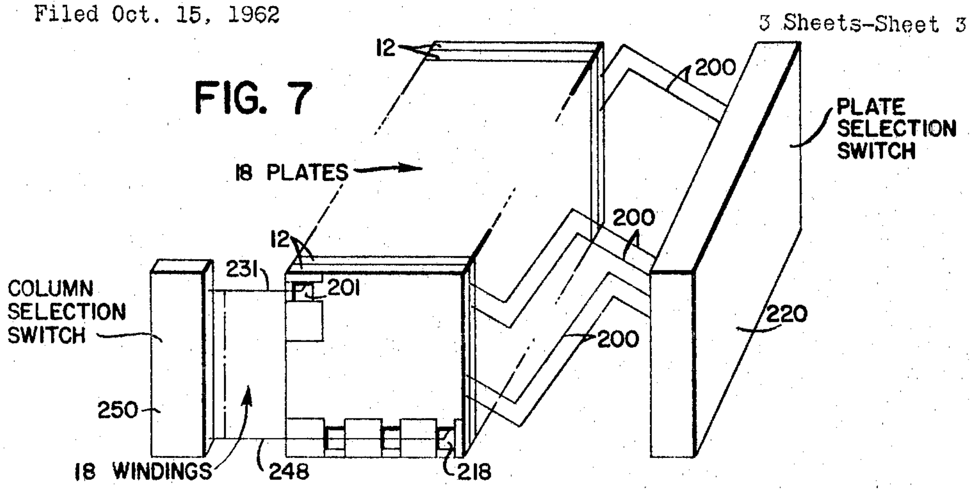
FIG. 7 is a perspective view of a three dimensional coincident-current type memory utilizing a stack of the plates illustrated in FIG. 6.
Figure 6:
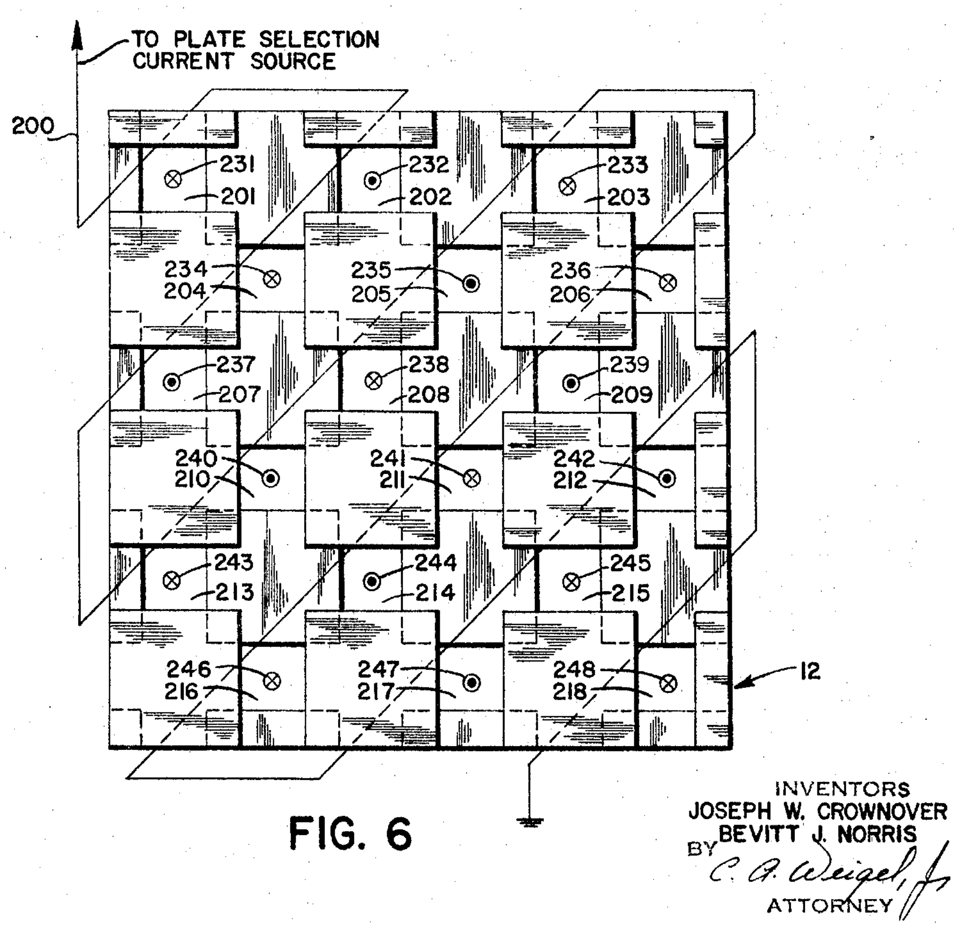
FIG. 6 is a plan view of another form of a two dimensional coincident-current type memory using a multi-apertured plate of the type illustrated in FIGS. 2 and 3.

In FIGS. 6 and 7 there is illustrated still another embodiment of a coincident-current type memory using the apertured plates 12 of the type illustrated in FIGS. 2 and 3, for example. FIG. 6 illustrates the details of the wiring of a single plate 12, whereas FIG. 7 illustrates a group of plates 12 stacked together with corresponding apertures in alignment and wired in the manner shown in FIG. 6 to form a coincident-current memory. In the embodiment of FIGS. 6 and 7, in contrast of the embodiment illustrated in FIG. 5, the edges of the plates 12 are trimmed substantially parallel to the grooves 14, 16, 18 and 20 (FIG. 2), respectively. For convenience of drawing, an apertured plate 12 having three grooves in each to two orthogonal directions in each surface is illustrated.

In the embodiment of FIGS. 6 and 7, instead of a given plate facilitating all of the storage elements for one binary bit in a computer word as is often true in coincident-current type memories, a stack of plates 12 facilitates the one binary bit of a word. To obtain the coincident-current type selection, the number of plates in a stack typically is equal to the number of apertures, or storage elements, in a given plate. Since there are 18 storage elements, 201–218 in the plate 12 of FIG. 6, the stack illustrated in FIG. 7 includes eighteen plates 12 for a total of 324 storage elements.

Because of the relatively low electrical conductivity of the ferrite material, each lattice plate 12 may be stacked immediately adjacent another plate with little danger of extraneous circulating currents being established which might destroy stored information.

As illustrated in FIG. 6, each plate 12 includes a single plate drive winding 200 continuously threaded through certain of the tunnels 28 (FIG. 2) of the tunnel plane to link each of the storage elements 201 to 218, inclusive. More specifically, the plate drive winding 200 is threaded in alternate directions through alternate, parallel tunnels 28 (FIG. 2). Alternate tunnels 28 are used such that each storage element 201–218 is linked only once, although if desired, every tunnel in a given direction may be used. In this latter event each element is linked twice, and half of the normal amplitude of the plate selection current is required. The plate drive winding 200 may be energized by a half-excitation select current from a select current source such as the plate selection switch 220 (FIG. 7). The plate selection switch 220, is the same as the row selection and drive means 130 described in conjunction with FIG. 5.

Eighteen column drive windings 231–248, inclusive, are threaded perpendicularly through the plane of the apertured plate 12 and are illustrated by small circles having an "*x*" to denote conventional current flow downwardly into the plane of the plate 12 and a dot to denote conventional current flow upwardly out of the plane of the plate 12. The threaded direction of the column drive windings is such as to link the several storage elements 201–218 in the same sense as the plate drive winding 200. For example, a positive current passing through the column drive winding 248 of the eighteenth storage element 218 in the direction indicated, produces a clockwise flux in the eighteenth storage element in does a positive current flow through the plate drive winding 200 to ground.

If desired an inhibit winding (not shown) may be threaded through the tunnels so as to parallel the plate or column drive windings and link each of the respective storage elements 201–218 oppositely to the manner in which they are linked by the respective plate and column drive windings. Additionally, a sense winding may be threaded through appropriate ones of the tunnels 28 (FIG. 2) in the internal tunnel plane of the plate 12 (FIG. 6) to link each of the storage elements 201–218, inclusive. Any well-known configuration to obtain noise cancellation in the sense winding may be used. For example, the tunnels may be selected to link one-half of the several storage elements in the same sense as the plate drive winding 200 and the remaining half in a sense opposite that of the plate drive winding 200. Alternatively, the plate selection winding 200 may be used as a sense winding. In this latter instance, one of the several column drive windings 230–248, inclusive, may be energized with a read current of appropriate amplitude to interrogate the particular storage element desired. By detecting the voltage induced in the plate drive winding 200 for that plate 12 containing the desired storage element, read out is achieved.

A plurality of the plates 12 of FIG. 6 may be stacked with corresponding apertures in alignment, in the manner illustrated in FIG. 7 to form a 324 bit coincident-current type memory. Using the apertured plates 12, each having eighteen storage elements as illustrated in FIG. 6, a total of eighteen plates 12 may be stacked to form an 18 x 18 coincident-current type memory. The wiring of the stack is substantially the same as that for the single plate 12 illustrated in FIG. 6, the primary difference being that the column drive windings 231–248 inclusive, each pass through corresponding aligned storage elements of each plate 12 of the stack rather than only the storage element of a single plate.

Each of the column drive windings 231–248, inclusive, are energized by a column selection switch 250 which may be the same as the column selection and drive means 142 of FIG. 5. Each of the apertured plates 12 in the stack illustrated in FIG. 7 is threaded by an individual plate drive winding 200 from the plate selection switch 220 in the same manner illustrated in FIG. 6.

The operation of the memory illustrated in FIG. 7 is quite similar to that of any conventional coincident-current type memory. Access to any given storage element may be had by energizing one plate select winding 200 and one column select winding 231–248. If it is desired to select the eighteenth storage element 218 in the first plate 12 (the front plate in the drawing), for example, the front (in the drawing) plate drive winding 200 along with the eighteenth column drive winding 248 are energized. These currents coincide at the eighteenth storage element of the front plate 12 to effect the writing, reading, etc. If during the read operation it is desired to utilize the plate select windings 200 as the sense winding, only the column drive windings 231 to 248 inclusive, are energized. By connecting the plate drive winding 200 to a suitable sense amplifier, through suitable logic circuitry, the magnetic state of the selected element may be determined.

A plurality of stacks of the type illustrated in FIG. 7 may be employed, one for each binary bit of a computer word. In this instance, the plate drive windings 200 may be threaded continuously through correspondingly positioned plates 12 of each of the stacks. In like manner each of the column drive windings 231 to 248, inclusive, are threaded continuously through corresponding columns of storage elements in the several stacks. Individual sense windings may be provided for each stack.

There has thus been described an improved multi-apertured ferrite plate memory. The geometry of the apertures in the plate is such that each aperture, or storage element, is substantially magnetically isolated from every other storage element. Additionally, the multi-apertured plate has an internal plane of tunnels interconnecting the several storage elements. The several storage elements may be wired using only the tunnels to form a coincident-current type memory capable of being interrogated non-destructively. Alternatively, the tunnels need not be employed and the novel apertured plate wired as by weaving the drive, sense, and inhibit winding through the desired storage elements.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. A multi-apertured magnetic structure in which the magnetic material surrounding each aperture is capable of being selectively magnetized to either of two different senses of remanent magnetization to represent digital information comprising:

a slab of magnetic material which has a substantially constant thickness T, exhibits a substantially rectangular magnetic hysteresis characteristic, and has substantially parallel first and second planar surfaces defining the thickness dimension T;

said slab having first and second sets of grooves in said first surface of said slab;

said slab having third and fourth sets of grooves in said second surface of said slab;

each of the grooves of said first and third sets being substantially parallel in a first direction and alternately positioned on their respective surfaces;

each of the grooves of said second and fourth sets being substantially parallel in a second direction different from said first direction and alternately positioned on their respective surfaces;

each of said grooves having a depth substantially equal to or greater than half the thickness T of said slab as measured perpendicularly to said parallel surfaces, thereby to form apertures in said slab at the intersections of those grooves in opposite surfaces of said slab;

said apertures being characterized in that the magnetic material forming each aperture is substantially magnetically isolated from the magnetic material forming every other aperture.

2. The multi-apertured magnetic structure set forth in claim 1 wherein:

each of the grooves has a width that is less than the spacing, as measured parallel to either of said surfaces, between adjacent grooves in each said set, thereby to establish first and second sets of effective tunnels in the interior portion of said slab substantially parallel to each of said surfaces.

3. The multi-apertured magnetic structure set forth in claim 2 wherein said second direction is substantially perpendicular to said first direction.

4. The multi-apertured magnetic structure set forth in claim 3 wherein each of the tunnels of said first set are substantially parallel to each other and in a direction substantially at 45° with respect to said first and second directions, each of the tunnels of said second set being substantially parallel to each other and in a direction substantially perpendicular to each of said first set of tunnels, whereby each of said apertures is connected by at least one of each of said sets of tunnels.

5. The multi-apertured magnetic structure set forth in claim 4 wherein the perpendicular cross section of each of said grooves is substantially rectangular.

6. A multi-apertured magnetic structure in which the magnetic material surrounding each aperture is capable of being selectively magnetized to either of two different senses of remanent magnetization to represent digital information comprising:

a slab of magnetic material which has a substantially constant thickness T, exhibits a substantially rectangular magnetic hysteresis characteristic, and has substantially parallel first and second planar surfaces defining the thickness dimension T;

and said slab having first and second sets of grooves in said first surface of said slab;

said slab having third and fourth sets of grooves in said second surface of said slab;

successive grooves of said first and third sets being alternately positioned with respect to each other and substantially parallel in a first direction;

successive grooves of said second and fourth sets being alternately positioned with respect to each other and substantially parallel in a second direction different from said first direction;

each of said grooves having a depth substantially equal to or greater than half the thickness T of said slab as measured perpendicularly to said parallel surfaces, thereby to form apertures in said slab at the intersections of those grooves in opposite surfaces of said slab;

each of the grooves having a substantially constant maximum width that is less than the spacing between adjacent grooves in a set, thereby to establish first and second sets of effective tunnels in the interior portion of said slab substantially parallel to each of said surfaces;

separate energizing means threaded through alternate tunnels of each set of tunnels for effecting a partial change of state of the magnetic material surrounding each of said apertures.

7. The combination set forth in claim 6 which includes circuit means to control the simultaneous energization of one of said energizing means of each set of tunnels thereby to change the magnetic state of the material surrounding that aperture lying at the intersection of each said one energizing means.

8. The combination set forth in claim 7 wherein said circuit means includes means for controlling the magnitudes of energization of said energizing means, and sense winding means threaded through selected ones of said tunnels to link magnetically the magnetic material forming at least one of said apertures.

9. A multi-apertured magnetic structure in which the magnetic material surrounding each aperture is capable of being selectively magnetized to either of two different senses of remanent magnetization to present digital information comprising:

a plate of magnetic material having a thickness T defined by substantially parallel first and second planar surfaces and having the characteristic of being substantially magnetically saturated at remanence, said plate having first and second substantially parallel grooves in different ones of said first and second surfaces, said plate having third and fourth substantially parallel grooves in different ones of said first and second surfaces, said first and second grooves being in a different direction to said third and fourth grooves, each of said grooves having a depth substantially between T/2 and T, whereby apertures are formed in said plate at each of the intersections of said grooves lying in opposite surfaces.

10. The magnetic structure set forth in claim 9 wherein each of said grooves has a width that is greater than the spacing between adjacent ones of said grooves lying in the same direction, whereby there exists effective tunnels in the interior portion to the said slab, substantially parallel to said surfaces, that interconnect at least two of said apertures.

11. The magnetic structure set forth in claim 10 which also includes conductive means threaded through selected ones of said tunnels.

12. The magnetic structure set forth in claim 11 which also includes means for selectively energizing said conductive means for establishing a magnetic flux in the magnetic material surrounding at least one of said apertures thereby to magnetically represent said information.

13. A multi-apertured magnetic structure in which the magnetic material surrounding each aperture is capable of being selectively magnetized in either of two different senses of remanent magnetization to represent digital information comprising:

a slab of magnetic material which has a substantially constant thickness T, exhibits a substantially rectangular magnetic hysteresis characteristic, and has substantially parallel first and second planar surfaces defining the thickness dimension T;

said plate having a first set of substantially parallel grooves lying in a first direction and alternately positioned in said first and second surfaces;

said plate having a second set of substantially parallel grooves lying in a second direction that intersects said first direction, the grooves of said second set being alternately positioned in said first and second surfaces;

each of said grooves having a depth that is substantially equal to or greater than T/2 whereby the intersections of the several grooves form apertures in the plate, said apertures being characterized in that the magnetic material forming each aperture is substantially magnetically isolated from the magnetic material forming every other aperture.

14. The structure set forth in claim 13 in which each of said grooves has a width that is substantially equal to or greater than the spacing, as measured substantially parallel to either of said surfaces, between adjacent ones of the grooves of each of said first and second sets of grooves, whereby first and second sets of effective tunnels are formed in the interior portion of said plate substantially parallel to either of said surfaces, each of said tunnels interconnecting at least two of said apertures.

15. The structure set forth in claim 14 wherein said first and second sets of grooves are orthogonally disposed with respect to each other.

16. The structure set forth in claim 14 which includes conductive means threaded through selected ones of said tunnels and means to energize said conductive means, thereby to establish a magnetic flux in the magnetic material surrounding said threaded apertures.

17. A multi-apertured magnetic structure in which the magnetic material surrounding each aperture is capable of being selectively magnetized to either of two different senses of remanent magnetization to represent digital information comprising:

a plate of magnetic material which has a substantially constant thickness T, exhibits a substantially rectangular magnetic hysteresis characteristic, and has substantially parallel first and second planar surfaces defining the thickness dimension T;

said plate having a first set of substantially parallel grooves lying in a first direction and alternately positioned in said first and second surfaces;

said plate having a second set of substantially parallel grooves lying in a second direction that intersects said first direction, the successive grooves of said second set being alternately positioned in said first and second surfaces;

each of said grooves having a depth that is substantially equal to or greater than T/2, whereby the intersections of the several grooves in said first surface with those in said second surface form apertures in the plate;

each of said grooves having a width that is substantially equal to or greater than the spacing, as measured substantially parallel to either of said surfaces, between successive grooves of each of said first and second sets of grooves, whereby first and second sets of effective tunnels exist in the interior portion of said plate substantially parallel to each of said surfaces, each of said tunnels interconnecting selected ones of said apertures;

a separate wire threaded through each tunnel of each of said set of tunnels;

means for simultaneously energizing one wire of each set to excite the magnetic material surrounding the aperture lying at their intersection by a total amount insufficient to effect a change of state of the magnetic material.

18. The structure set forth in claim 17 which also includes a sensing wire threaded through selected tunnels of said first set for non-destructively sensing the magnetic flux change, and thereby the remanent magnetic state of the magnetic material surrounding said aperture at the intersection of said energizing wires.

19. A device for magnetically representing information comprising:

a stack of multi-apertured magnetic plates in which the magnetic material surrounding each aperture is capable of being selectively magnetized to either of two different senses of remanent magnetization to represent digital information;

each plate of said stack having corresponding apertures in alignment;

each plate being of a magnetic material which has a substantially constant thickness T, exhibits a substantially rectangular magnetic hysteresis characteristic, and has substantially first and second planar surfaces defining the thickness dimension T;

each said plate having a first set of substantially parallel grooves lying in a first direction and alternately positioned in said first and second surfaces of said plate;

each said plate having a second set of substantially parallel grooves lying in a second direction intersecting said first direction and alternately positioned in said first and second surfaces;

each of said grooves having a depth that is substantially equal to or greater than T/2, whereby the intersections of the several grooves in said first surface with those in said second surface form apertures in the plate;

each of said grooves having substantially the same width that is substantially equal to or greater than the spacing between adjacent ones of the grooves of a given set, whereby first and second sets of effective tunnels exist in the interior portion of said plate interconnecting rows and columns of said apertures;

a first set of wires in which a different wire is continuously threaded in alternate directions through alternate tunnels of one of said sets of tunnels in each of said plates;

a second set of wires in which a different wire is threaded through the aligned apertures of each of said plates;

and means for simultaneosuly energizing one wire of each set to excite the magnetic material surrounding the aperture at their intersection.

No references cited.

BERNARD KONICK, *Primary Examiner.*

J. MOFFITT, *Assistant Examiner.*